(12) United States Patent
Lansel et al.

(10) Patent No.: US 11,048,091 B1
(45) Date of Patent: Jun. 29, 2021

(54) WIDE-FIELD IMAGE LIGHT AND INSET IMAGE LIGHT FOR HEAD MOUNTED DISPLAYS

(71) Applicant: Facebook Technologies, LLC, Menlo Park, CA (US)

(72) Inventors: Steven Paul Lansel, East Palo Alto, CA (US); Sebastian Sztuk, Menlo Park, CA (US); Kirk Eric Burgess, Newark, CA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/697,118

(22) Filed: Nov. 26, 2019

Related U.S. Application Data

(60) Provisional application No. 62/900,211, filed on Sep. 13, 2019.

(51) Int. Cl.
*G06F 3/01* (2006.01)
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0036* (2013.01); *G02B 6/0076* (2013.01); *G06F 3/012* (2013.01); *G06F 3/013* (2013.01); *G02B 2027/0123* (2013.01); *G02B 2027/0147* (2013.01); *G02B 2027/0178* (2013.01)

(58) Field of Classification Search
CPC ......... A61M 2205/507; G02B 27/0081; G02B 27/0093; G02B 27/30; G06F 3/013; G06T 5/10; G06T 7/20; G09G 2300/023; G09G 2320/0613; G09G 2320/068; G09G 2340/0407; G09G 2354/00; G09G 5/10; H04N 13/332; H04N 9/3102
See application file for complete search history.

(56) References Cited

U.S. PATENT DOCUMENTS

| | | | |
|---|---|---|---|
| 6,307,480 B1* | 10/2001 | Sheldon | G06F 1/24 327/143 |
| 2010/0149073 A1* | 6/2010 | Chaum | G02B 27/0172 345/8 |
| 2013/0222384 A1* | 8/2013 | Futterer | G02B 27/0103 345/426 |
| 2016/0240013 A1* | 8/2016 | Spitzer | G02B 27/0179 |
| 2016/0370855 A1* | 12/2016 | Lanier | G06F 3/005 |
| 2019/0387168 A1* | 12/2019 | Smith | G06F 3/0304 |

OTHER PUBLICATIONS

U.S. Appl. No. 16/287,785, unpublished, Gollier.

* cited by examiner

*Primary Examiner* — Ram A Mistry
(74) *Attorney, Agent, or Firm* — Freestone Intellectual Property Law PLLC; Aaron J. Visbeek

(57) ABSTRACT

An image generator is configured to generate display light. A first waveguide is configured to generate wide-field image light from a first portion of the display light. A first outcoupling element of the first waveguide extends to a boundary of the frame to provide the wide-field display to substantially all of the augmented FOV of the user. A second waveguide is configured to generate inset image light from a second portion of the display light received from the image generator.

18 Claims, 15 Drawing Sheets

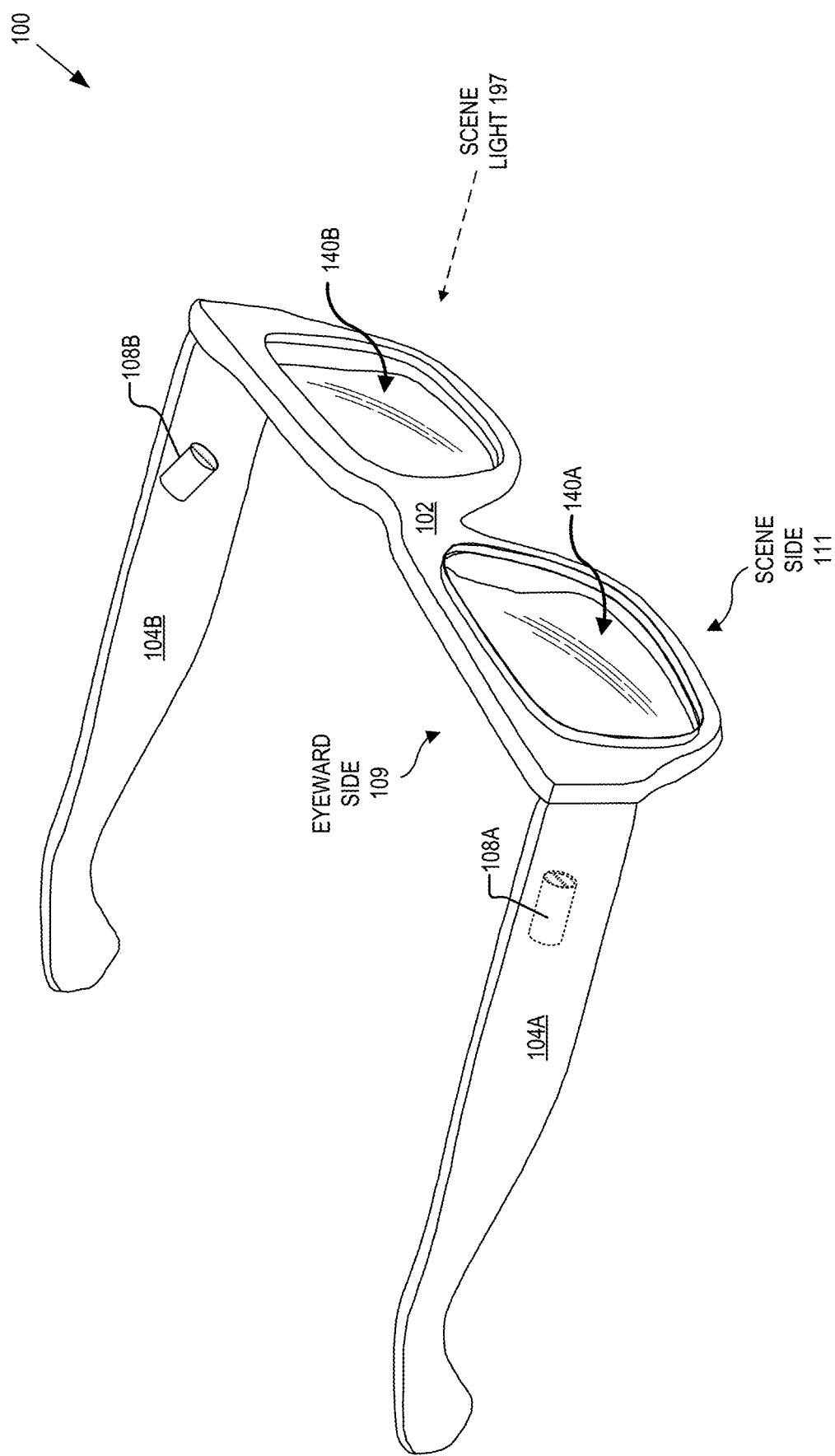

WIDE-FIELD IMAGE LIGHT AND INSET IMAGE LIGHT FOR HEAD MOUNTED DISPLAYS

CROSS REFERENCE TO RELATED APPLICATIONS

The present Application claims the benefit of U.S. Provisional Application No. 62/900,211, entitled "Wide-Field Display Light and Inset Display Light for Head Mounted Displays" filed Sep. 13, 2019. U.S. Provisional Application No. 62/900,211 is expressly incorporated herein by reference in its entirety.

BACKGROUND INFORMATION

The field of view (FOV) for conventional head mounted displays is about 90-100 degrees horizontal. It is desirable to have virtual image content in most or all of the FOV so that virtual images will not appear to disappear in particular places in the FOV. However, as the FOV expands, display resolution is often sacrificed. When the virtual image content is only provided in a narrow FOV, a user may be less immersed in the experience. Noticeable gaps between the user's full FOV and the images in the narrow FOV may highlight the difference between the real-world and the virtual world, particularly with respect to Augmented Reality (AR) or Mixed Reality (MR) contexts.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1 illustrates an example HMD, in accordance with aspects of the present disclosure.

DETAILED DESCRIPTION

Figure 2A:
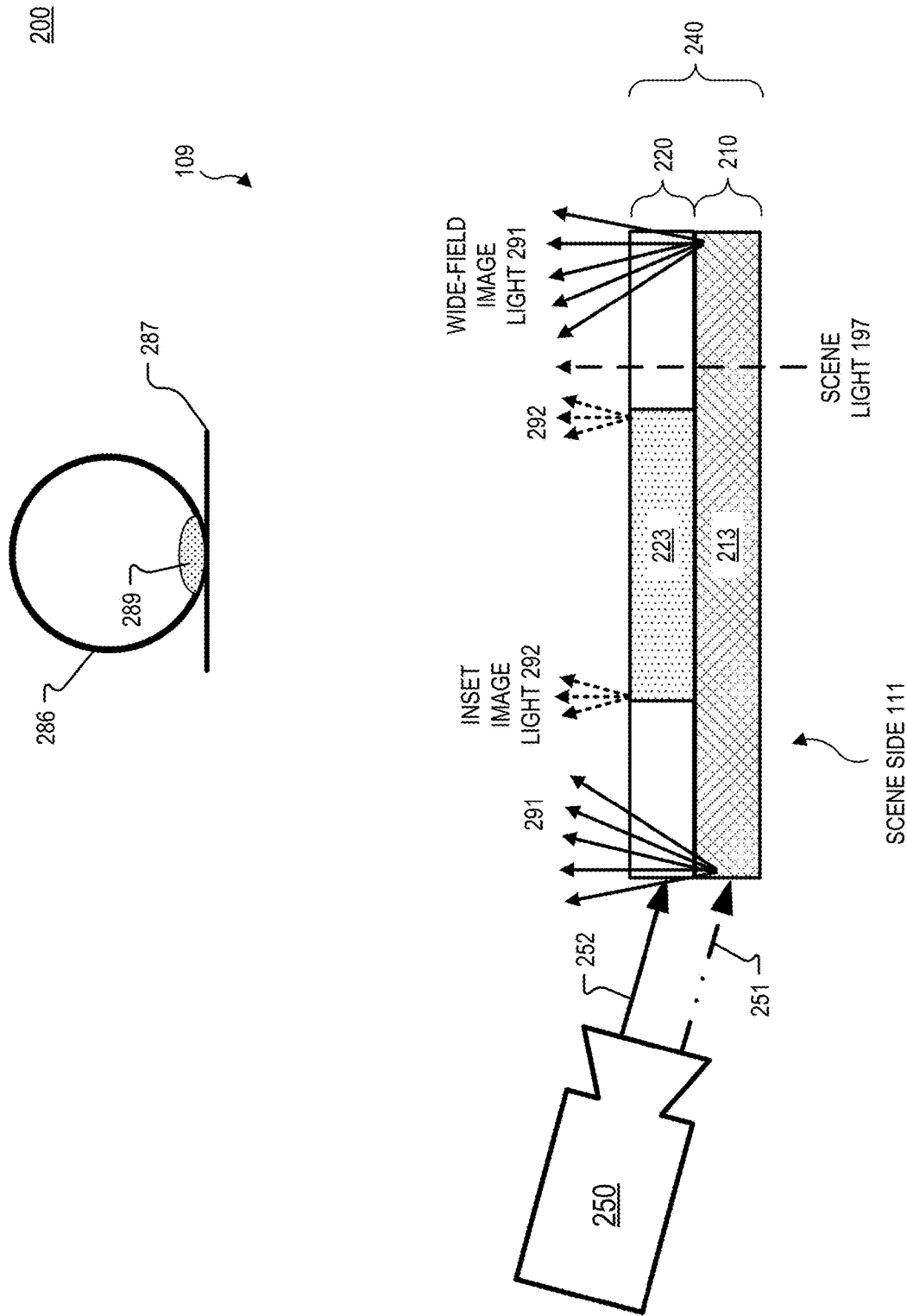
FIG. 2A illustrates a functional diagram of a near-eye display system including an example near-eye optical element that includes a first waveguide and a second waveguide, in accordance with aspects of the disclosure.

Embodiments of a system, device, and method for providing wide-field image light with high resolution inset image light are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The systems, devices, and methods of the disclosure include providing a wide-field image light with high resolution inset image light with a head mounted display (HMD). In some embodiments of the disclosure, a first waveguide provides the wide-field image light and a second waveguide provides inset image light having a narrow field of view (FOV) than the wide-field image light. The first waveguide may be stacked with the second waveguide so that the second waveguide is closer to an eye of a user of the HMD. In some embodiments, a steerable projector may be utilized to illuminate the second waveguide so that the inset image light has a higher pixel density than the wide-field image light from the first waveguide. The steerable projector could also change properties of its lens to focus the light to a more or less narrow FOV in order to change the resolution of the second waveguide. A higher resolution associated with the second waveguide may scale with the eye as the eye looks in the region of the second waveguide based on eye tracking information, to achieve higher resolution when the eye is closer to the center of the second waveguide. In some embodiments, inset image light may be selectively presented to an eyebox area in response to inputs such as head-motion data, HMD battery status, HMD power status, and/or eye-tracking data. These and other embodiments are described in more detail in connections with FIGS. 1-12.

FIG. 1 illustrates an example HMD 100, in accordance with aspects of the present disclosure. The illustrated example of HMD 100 is shown as including a frame 102, temple arms 104A and 104B, and near-eye optical elements 140A and 140B. Eye-tracking cameras 108A and 108B are shown as coupled to temple arms 104A and 104B, respectively. In some embodiments, eye-tracking cameras 108A and/or 108B may receive non-visible light (e.g. near-infrared light) from an optical combiner included in near-eye optical elements 140A/B. In other embodiments, eye-tracking cameras 108A and/or 108B may be positioned to image the eye directly. Near-eye optical elements 140 may include a display layer including multiple waveguides that are configured to direct virtual images to an eye of a user of HMD 100. For example, the display layer may include a waveguide to direct image light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light. "Near-eye optical elements" may be defined as including an optical element that is configured to be placed within 35 mm of an eye of a user while a near-eye optical device such as an HMD is being utilized, in some embodiments.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 140A and 140B that are configured to be mounted to the frame 102. In some examples, near-eye optical elements 140A and 140B may appear transparent to the user to facilitate augmented reality or mixed reality such that the user can view visible scene light 197 from the environment while also receiving image light directed to their eye(s) by way of the display layer. In further examples, some or all of near-eye optical elements 140A and 140B may be incorporated into a virtual reality headset where the transparent nature of the near-eye optical elements 140A and 140B allows the user to view an electronic display (e.g., a liquid crystal display (LCD), an organic light emitting diode (OLED) display, a micro-LED display, etc.) incorporated in the virtual reality headset. In some aspects, near-eye optical elements 140A and 140B include an optically transparent layer having a thickness and/or curvature that corresponds to the specifications of a user. In other words, the optically transparent layer may be a prescription lens. However, in other examples, the optically transparent layer may be a non-prescription lens.

In some examples, eye-tracking cameras 108 include an infrared camera configured to image the eye of the user based on the received infrared light. In some embodiments, near-eye optical elements 140 include a combiner layer configured to direct infrared light to the cameras to facilitate imaging the eye of a user for eye-tracking purposes.

FIG. 2A illustrates a functional diagram of a near-eye display system 200 including an example near-eye optical element 240 that includes a first waveguide 210 and a second waveguide 220, in accordance with aspects of the disclosure. Near-eye display system 200 also includes an image generator 250 configured to generate display light. Image generator 250 may be implemented as one or more image projectors, in some embodiments. Image generator 250 may include one or more LCOS projectors, in some embodiments. A first portion of the display light 251 is directed to first waveguide 210 and a second portion of the display light 252 is directed to second waveguide 220. First waveguide 210 is configured to generate wide-field image light 291 from first portion of the display light 251 received from image generator 250 and second waveguide 220 is configured to generate inset image light 292 from the second portion of the display light 251 received from image generator 250. Inset image light 292 provides a narrower FOV to a pupil 289 of eye 286 than the wide-field image light 291. Inset image light 292 may be of a higher resolution or a higher pixel density than wide-field image light 291 so that the user may view higher resolution images while still viewing wide-field image light 291 throughout their FOV. For the purposes of the disclosure, reference to "resolution" will refer to angular resolution which is defined as the number of pixels from a display system contained in a field of view of a certain angle. In this disclosure, "pixel density" will refer to angular pixel density. Angular pixel density may differ from a "pixels per inch" metric or "pixel pitch" metric associated with display panels, for example.

In the illustrated embodiment of near-eye display system 200, first waveguide 210 is stacked with second waveguide 220 such that second waveguide 220 is closer to a scene side 111 of an HMD that near-eye display system 200 would be installed in. In this embodiment, wide-field image light 291 may propagate through at least a portion of second waveguide 220 without propagating through the second outcoupling element 223 of second waveguide 220.

Figure 2B:
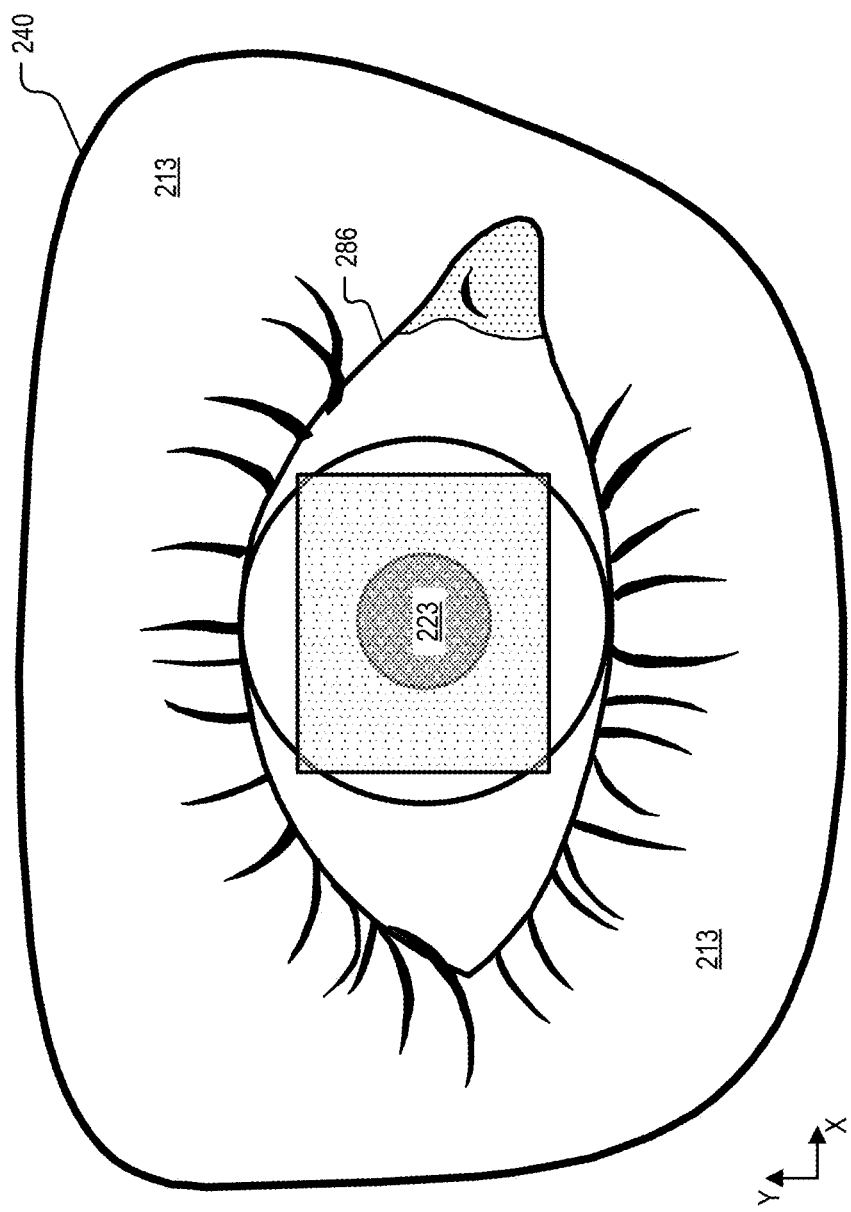
FIG. 2B illustrates a front view of a near-eye optical element placed in front of an eye, in accordance with aspects of the disclosure.

FIG. 2B illustrates a front view of a near-eye optical element 240 placed in front of an eye 286, in accordance with aspects of the disclosure. FIG. 2B shows that a first outcoupling element 213 of a first waveguide 210 may extend to an edge of near-eye optical element 240 and therefore first outcoupling element 213 may extend to a boundary of a frame (e.g. 102) to provide wide-field image light 291 to substantially all of the augmented FOV of the user, when near-eye optical element 240 is inserted into a frame (e.g. 102) of an HMD. Second outcoupling element 223 occupies a smaller footprint than first outcoupling element 213 and does not extend to the boundary of near-eye optical element 240, in FIG. 2B. The augmented FOV of the user may be defined as the FOV of the user through the near-eye optical elements 140 and within frame 102. Second outcoupling element 223 may be positioned to provide the inset image light 292 to eye 286 where pupil 289 will be positioned a majority of time for experiences or tasks that benefit from higher resolution images. In some examples, second outcoupling element 223 is roughly centered in near-eye optical element 240. In other embodiments, second outcoupling element 223 is positioned slightly down and slightly nasally with respect to eye 286 to provide the narrow FOV of the inset image light for activities that benefit from higher resolution images such as reading, for example. First outcoupling element 213 is configured to not outcouple wide-field image light 291 through second outcoupling element 223, in some embodiments.

Figure 3:
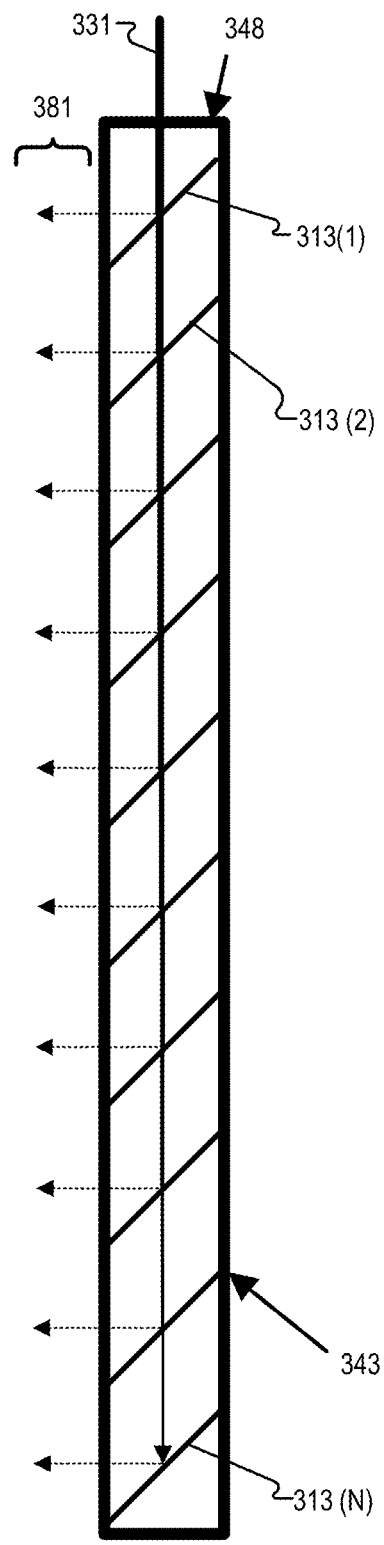
FIG. 3 illustrates one example of a waveguide implementation, in accordance with aspects of the disclosure.

FIG. 3 illustrates one example of a waveguide implementation that could be utilized for waveguides 210 or 220, in accordance with aspects of the disclosure. Example waveguide 343 is configured to receive display light 331 at a receiving end 348 of waveguide 343. In other waveguide examples, display light 331 may enter the waveguide from a front side or back side rather than an end such as receiving end 348. Display light 331 may be a first portion of display light 251 or a second portion of display light 252 received from image generator 250, for example. FIG. 3 illustrates that waveguide 343 includes a plurality of partially mirrored surfaces 313 configured to redirect display light 331 in an eyeward direction as image light 381. Display light 331 may be wide-field image light 291 or inset image light 292, for example. The partially mirrored surfaces 313 are progressively more reflective as a position of the partially mirrored surface gets farther from the receiving end 348 of the waveguide 343. The number N of partially mirrored surfaces is equal to ten in the diagram of FIG. 3, although N may be any number in different embodiments. The number N may be much larger or smaller than ten. Partially mirrored surface 313(N) is the last partially mirrored surface while 313(1) is the first partially mirrored surface, in FIG. 3. Partially mirrored surface 313(1) is the partially mirrored surface first encountered by display light 331. Since each partially mirrored surface reflects (and redirects) a portion of display light 331 to an eyebox area, the intensity of display light 331 progressively decreases as it propagates through waveguide 343 and encounters the partially mirrored surfaces 313. The width of the illustrated vector representing display light 331 within waveguide 343 decreases in FIG. 3 as it propagates through waveguide 343 to indicate its decreasing intensity.

In one embodiment, the partially mirrored surface 313(1) reflects less than 10% of display light 331 and the last partially reflective surface 313(N) is a mirror that approaches 100% reflectivity. Since the portion of display light 331 that encounters last partially mirrored surface 313(N) will have already propagated through partially mirrored surfaces 313(1), 313(2) . . . 313(N−1), the intensity of the display light 331 received by last partially mirrored surface 313(N) will be diminished compared to the intensity of the display light 331 received by partially mirrored surface 313(1). The reflectivity of each partially mirrored surface between feature 313(1) and 313(N) may progressively increase so that the display light 331 (propagating in an eyeward direction) is of substantially uniform intensity across the eyebox area. Since the partially mirrored surfaces are partially reflective, scene light 197 will still reach eye 286.

Figure 4:
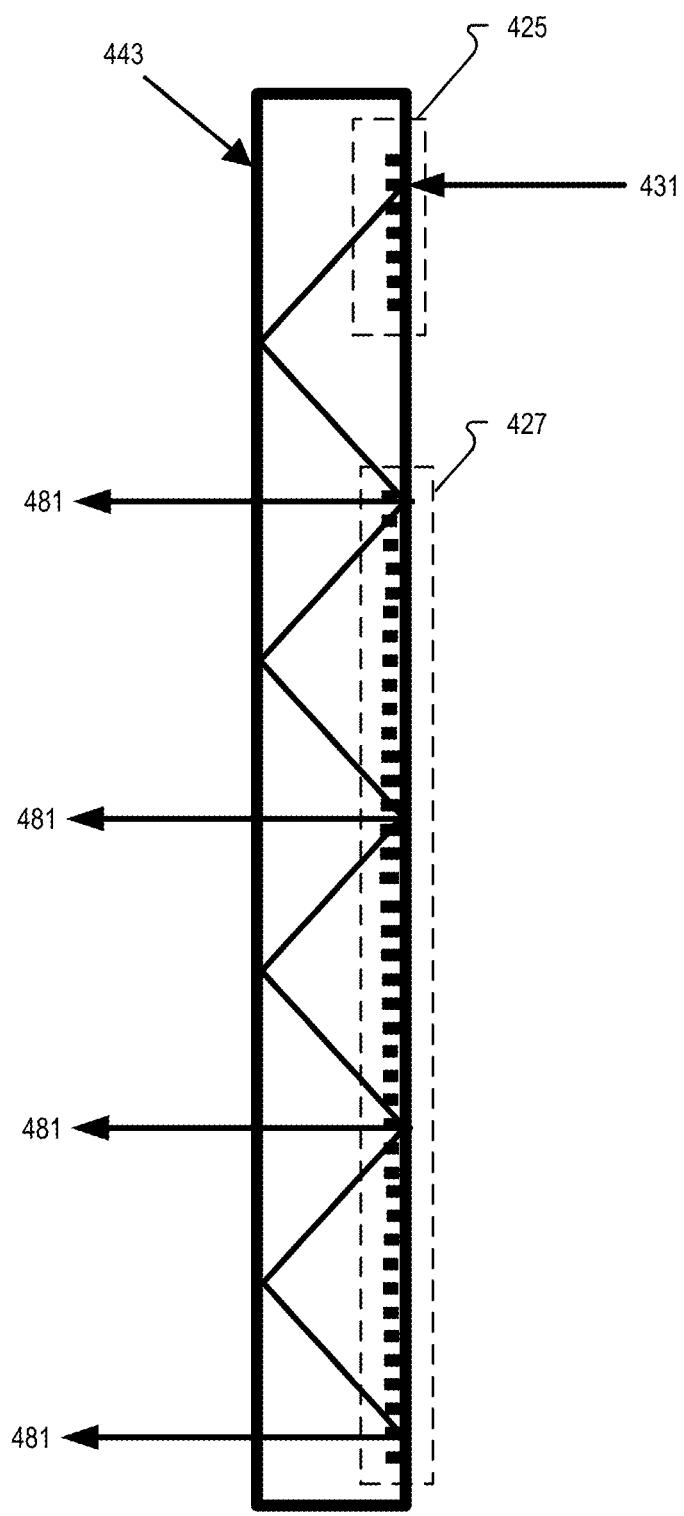
FIG. 4 is a diagram illustration of a waveguide that may include diffractive structures, in accordance with aspects of the disclosure.

FIG. 4 is a diagram illustration of a waveguide 443 that may include diffractive structures that may be utilized for waveguides 210 or 220, in accordance with aspects of the disclosure. Waveguide 443 is configured to incouple display light 431 into waveguide 443 with an incoupling region 425. Display light 431 may be first portion of display light 251 or second portion of display light 252 received from image generator 250, for example. Incoupling region 425 may include an incoupling diffractive structure implemented with a surface relief grating or a volumetric Bragg grating, for example. Display light 431 is confined by, and propagates down, waveguide 443 except where outcoupling element 427 outcouples display light 431 and directs display light 431 in an eyeward direction to an eyebox area as outcoupled image light 481. Image light 481 may be wide-field image light 291 or inset image light 292, for example.

Outcoupling element 427 may be a diffractive structure implemented with a surface relief grating or a volumetric Bragg grating, for example. In the illustrated embodiment, regions 425 and 427 are depicted on a side of waveguide 443 that is opposite of the eye-side, but the regions 425 and 427 may also be disposed on the eye-side of waveguide 443. Similarly, incoupling region 425 implemented as a diffractive structure may also operate in reflection or in transmission (as illustrated). When diffractive structures are used to implement regions 425 and 427, the diffractive structures may be angular and/or wavelength selective and thus light (e.g. scene light 197) not incident at the particular designed angled and/or wavelength for the diffractive structure may propagate through the diffractive structures with little or no adverse effect. When a projector is included in image generator 250 to generate light 251 and 252, the diffractive structures may be tuned to the angle of incidence of the projected light 251/252.

In the embodiments of the disclosure, a first waveguide may include a first incoupling region to receive the first portion of the display light and a first outcoupling element for generating the wide-field image light. A second waveguide may include a second incoupling region to receive the second portion of the display light and a second outcoupling element for generating the inset image light. In this case, the second incoupling region may be disposed outside of the augmented FOV defined by the frame (e.g. 102). Therefore, in embodiments where the first outcoupling element generates the wide-field image light, the second incoupling region (e.g. 425 in FIG. 4) may be disposed within the frame of an HMD and not in the augmented FOV of the user. Furthermore, in some embodiment, a first incoupling region of the first waveguide may also be disposed outside of the augmented FOV defined by the frame to allow the first outcoupling element to extend to the boundary of the frame to provide the wide-field image light to substantially all of the augmented FOV of the user.

Figure 5:
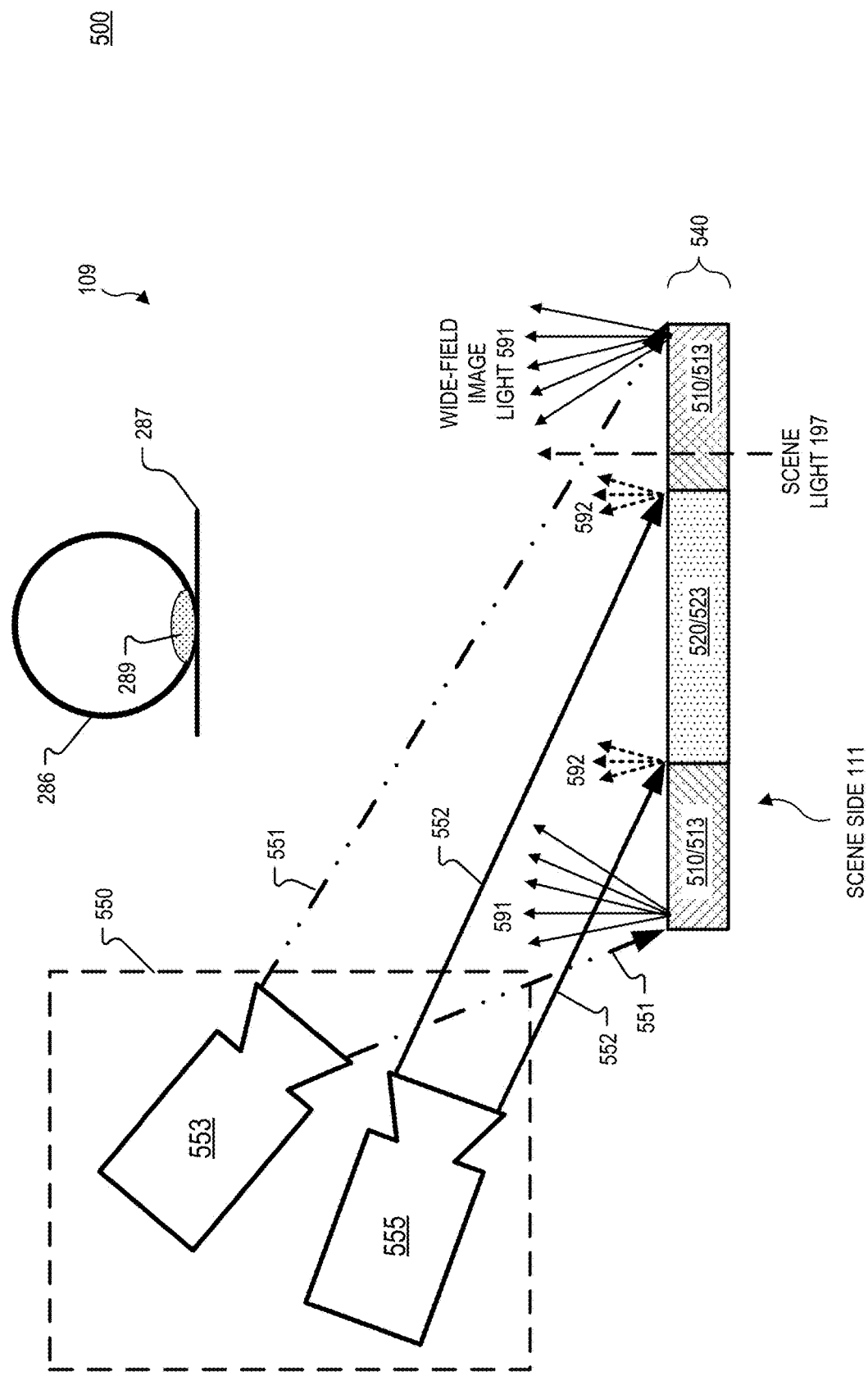
FIG. 5 illustrates a functional diagram of a near-eye display system including an example near-eye optical element that includes a first waveguide and a second waveguide, in accordance with aspects of the disclosure.

FIG. 5 illustrates a functional diagram of a near-eye display system 500 including an example near-eye optical element 540 that includes a first waveguide 510 and a second waveguide 520, in accordance with aspects of the disclosure. Rather than utilizing the stacked waveguide architecture of FIG. 2, system 500 includes outcoupling element 513 of waveguide 510 disposed on substantially a same plane as outcoupling element 523 of waveguide 520. In FIG. 5, second outcoupling element 523 is inset within the first outcoupling element 513.

In the particular embodiment illustrated in FIG. 5, image generator 550 includes a first projector 553 configured to direct the lower pixel density image as the first portion of the display light 551 onto the first outcoupling element 513 to generate the wide-field image light 591. In this embodiment, image generator 550 also includes a second projector 555 configured to direct the higher pixel density image as the second portion of the display light 552 onto the second outcoupling element 523 to generate the inset image light 592.

Figure 6:
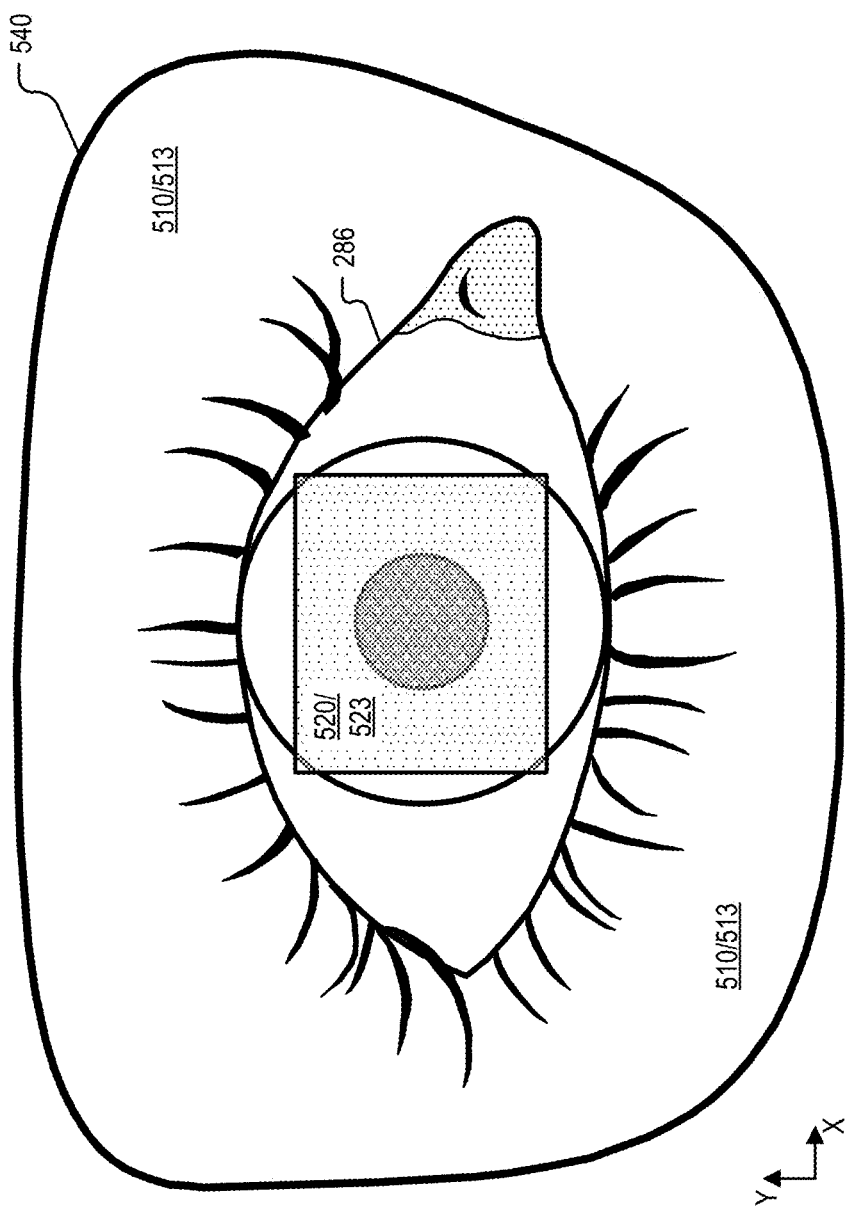
FIG. 6 illustrates a front view of a near-eye optical element placed in front of an eye, in accordance with aspects of the disclosure.

FIG. 6 illustrates a front view of near-eye optical element 540 placed in front of an eye 286, in accordance with aspects of the disclosure. FIG. 6 shows that a first outcoupling element 513 of first waveguide 510 may extend to an edge of near-eye optical element 540 and therefore first outcoupling element 513 may extend to a boundary of a frame (e.g. 102) to provide wide-field image light 591 to substantially all of the augmented FOV of the user, when near-eye optical element 540 is inserted into a frame (e.g. 102) of an HMD. Second outcoupling element 523 occupies a smaller footprint than first outcoupling element 513 and does not extend to the boundary of near-eye optical element 540, in FIG. 5. Second outcoupling element 523 may be positioned to provide the inset image light 592 to eye 286 where pupil 289 will be positioned a majority of time for experiences or tasks that benefit from higher resolution images. In some examples, second outcoupling element 523 is roughly centered in near-eye optical element 540. In other embodiments, second outcoupling element 523 is positioned slightly down and slightly nasally with respect to eye 286 to provide the narrow FOV of the inset image light for activities that benefit from higher resolution images such as reading, for example. First outcoupling element 513 is configured to not outcouple wide-field image light 591 through second outcoupling element 523, in some embodiments.

Figure 7A:
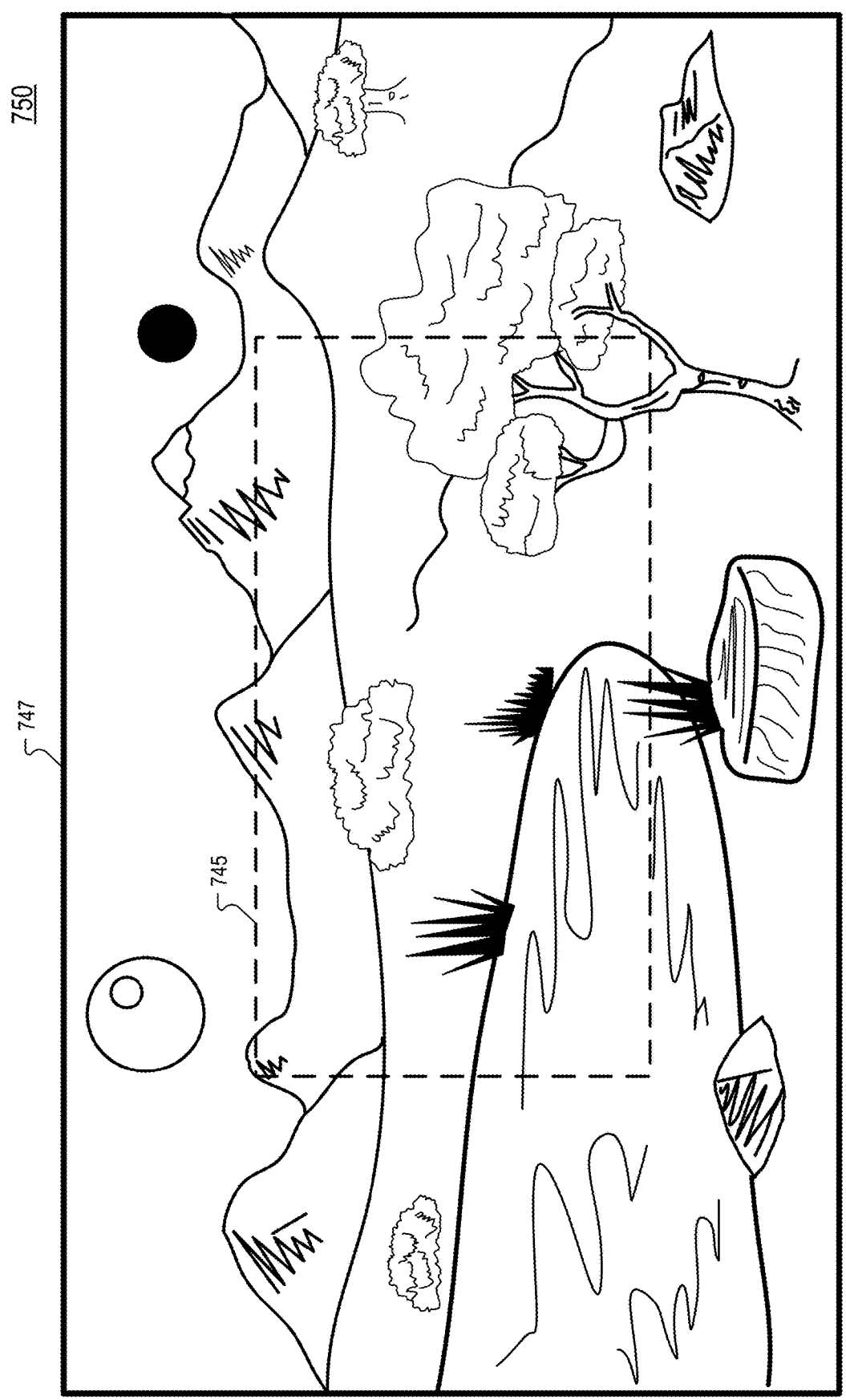
FIGS. 7A-7C illustrate an example rectangle-shaped combined image, in accordance with aspects of the disclosure.
Figure 7B:
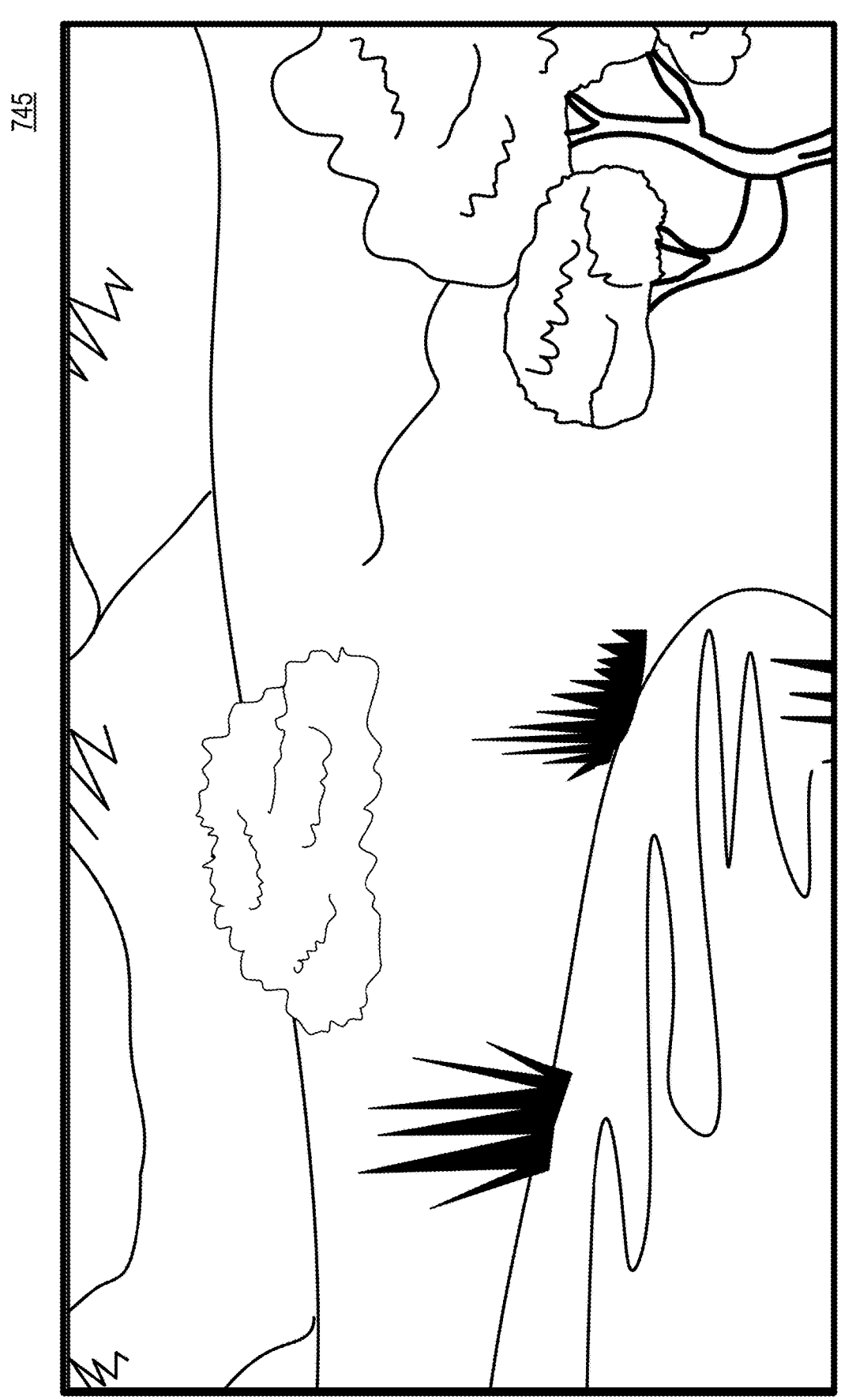
Figure 7C:
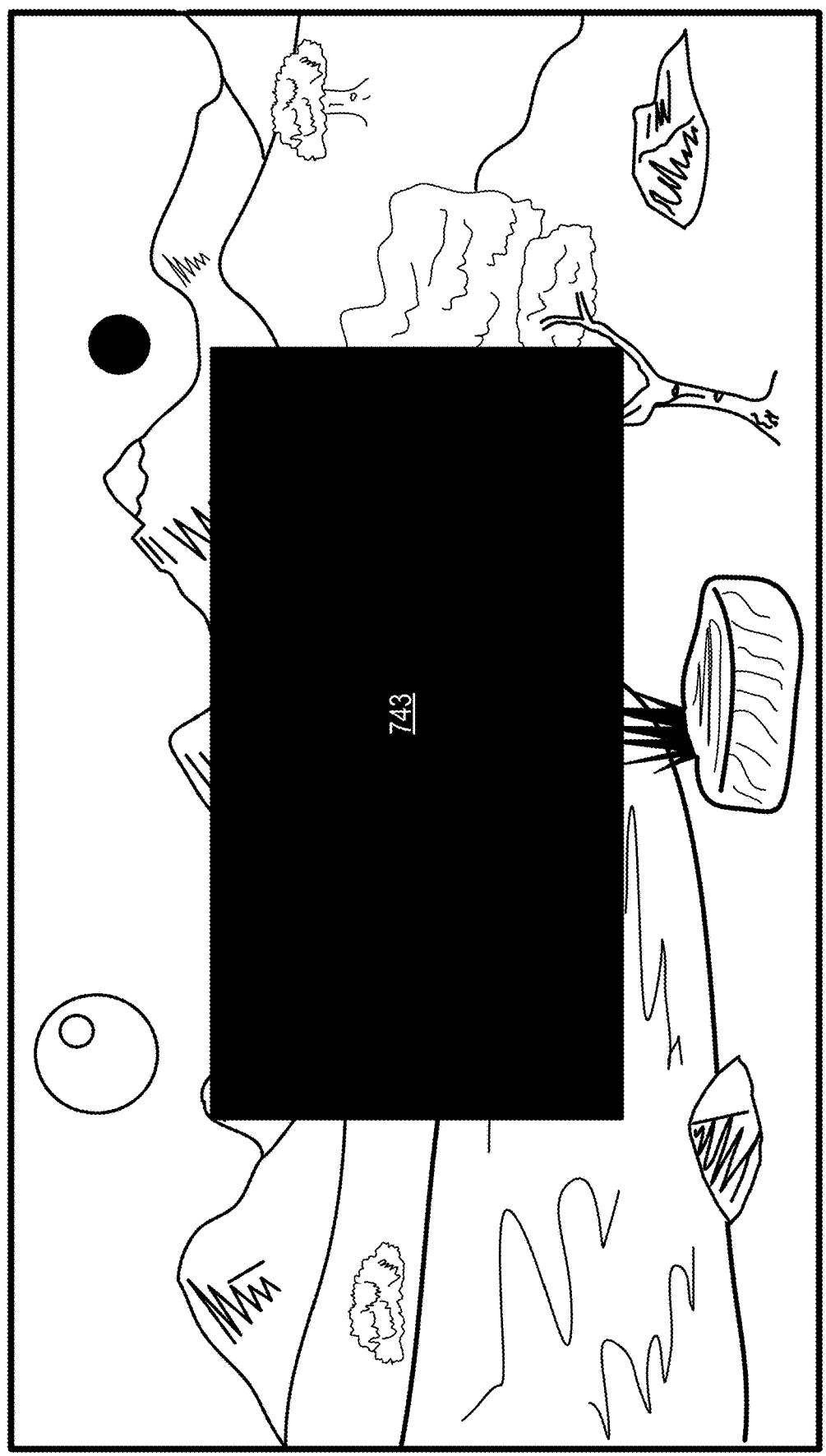

FIG. 7A illustrates an example rectangle-shaped combined image 750 for presenting to a user of an HMD. Those skilled in the art understand that although rectangular images are illustrated in FIGS. 7A-7C, non-rectangular images corresponding to non-rectangular displays or FOVs limited by rounded lens apertures may also be utilized. Combined image 750 includes a first image 745 and a second image 747. First image 745 may be formed by inset image light of the disclosure and second image 747 may be formed by wide-field image light of the disclosure. Therefore, image 747 may correspond with an augmented FOV and image 745 may correspond with a narrower FOV. The augmented FOV exceeds 60 degrees horizontal and the narrower FOV occupied by the inset image light exceeds 30 degrees horizontal, in some embodiments. In some embodiments, the augmented FOV approaches 100 degrees horizontal. Image 745 and image 747 may be presented sequentially to the users at a high frame rate so that the user perceives the sequential presentation of image 745 with image 747 as combined image 750, in some embodiments. In other embodiments, image 745 and image 747 may be presented at the same time and/or in overlapping time periods so the presentation of images 745 and 747 as perceived as a combined image 750. In some embodiments, first image 745 includes text. First image 745 may automatically be presented as a higher resolution image compared to second image 747 when text is included in first image 745. A fixed fade in and out or a Gaussian blur may be applied to the boundaries between images 745 and 747 to smooth the transition between images 745 and 747.

FIG. 7B illustrates image 745 that may be included in inset image light. FIG. 7C illustrates a second image 747 that may be included in wide-field image light. Notably, image 747 may have a void portion 743 of black pixels and the first image 745 may be presented in a viewing area that corresponds with void portion 743. A portion of the pixels in the image generator may be driven to have black pixel values to generate void 743. This may prevent the image light that would be emitted in void 743 from intermixing with the inset image light from image 745 that may be presented as a higher resolution image.

Figure 8:
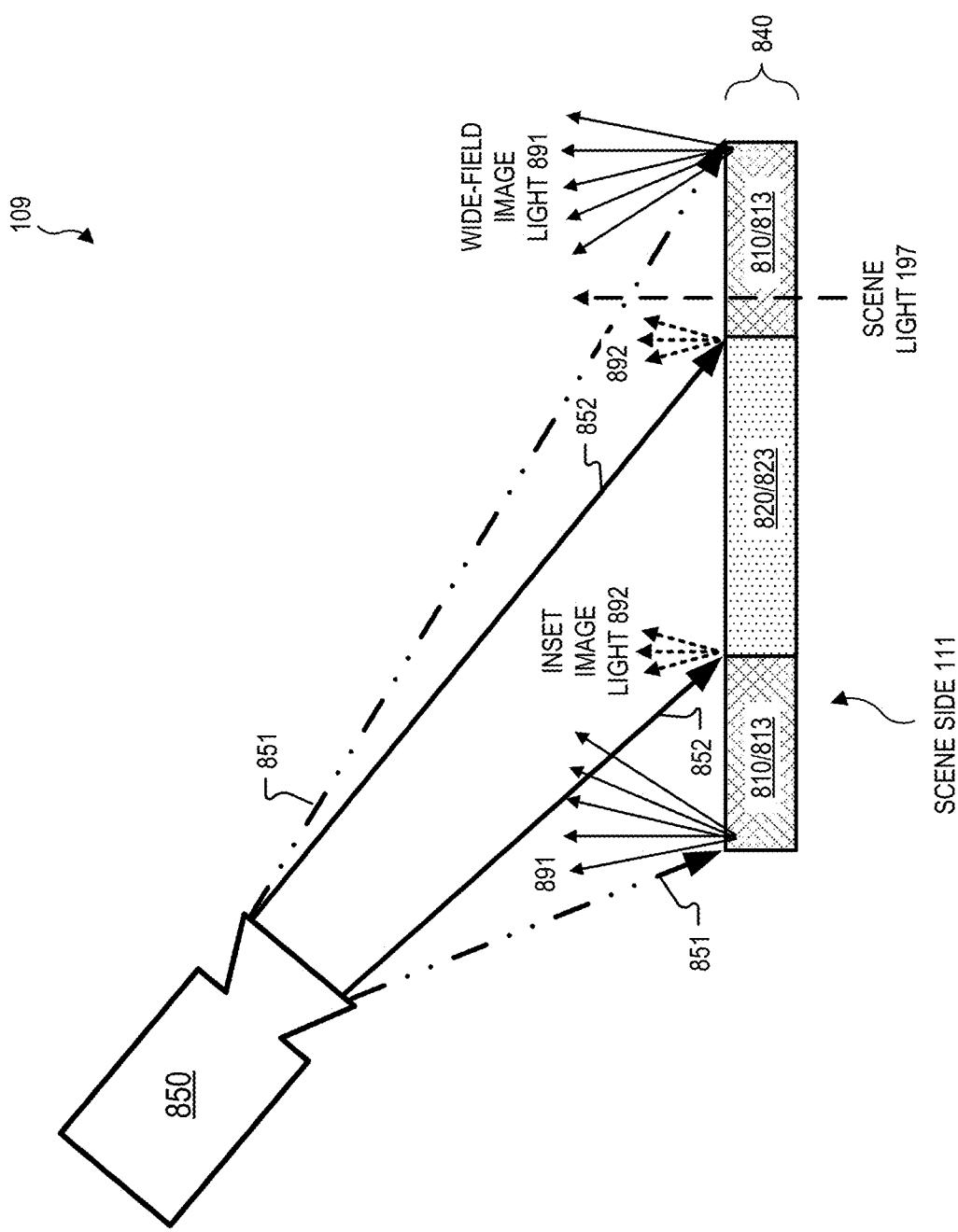
FIG. 8 illustrates a functional diagram of a near-eye display system including an example near-eye optical element that includes a first waveguide and a second waveguide, in accordance with aspects of the disclosure.

FIG. 8 illustrates a functional diagram of a near-eye display system 800 including an example near-eye optical element 840 that includes a first waveguide 810 and a second waveguide 820, in accordance with aspects of the disclosure. System 800 includes outcoupling element 813 of waveguide 810 disposed on substantially a same plane as outcoupling element 823 of waveguide 820. In FIG. 8, second outcoupling element 823 is inset within the first outcoupling element 813.

Image generator 850 includes a projector configured to project higher pixel density images as the second portion of the display light 852 onto the second outcoupling element 823 to generate the inset image light 892. The projector may also be configured to project a lower pixel density image as the first portion of the display light 851 onto the first outcoupling element 813. In an embodiment, the projector is configured to interleave the first portion of the display light 851 with the second portion of the display light 852 to interleave the higher pixel density image and the lower pixel density image. In one embodiment, second waveguide 820 is configured to output green light as the inset image light 892, but not configured to output red light or blue light since humans can see green light at higher resolutions. In this embodiment, first waveguide 810 may be configured to output red, green, and blue light. Green light is typically regarded as required for higher pixel density images. In some embodiments, the second portion of the display light 852 is displayed in a lower persistence mode and/or a higher frame rate than the first portion of display light 851 to reduce motion blur associated with the higher resolution inset image light 892 that is generated from the second portion of the display light 852.

Figure 9:
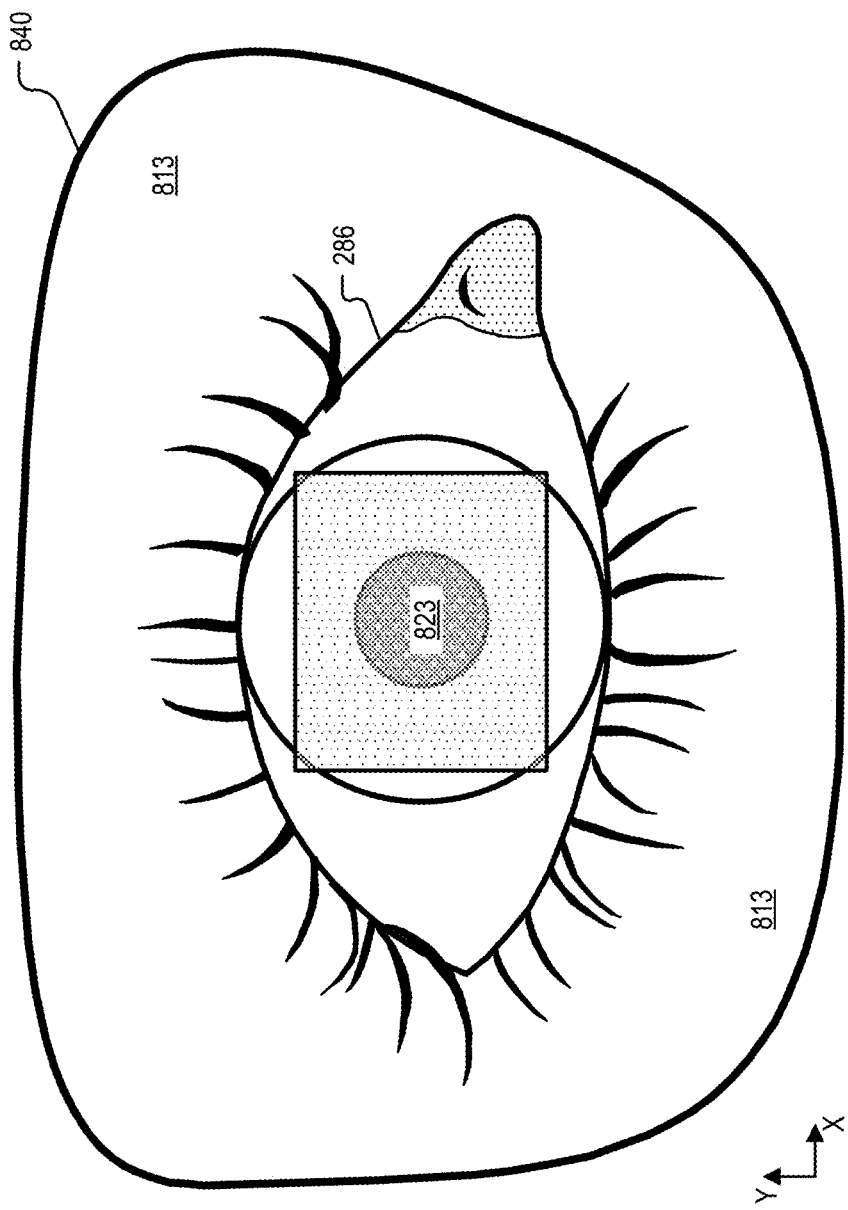
FIG. 9 illustrates a front view of a near-eye optical element placed in front of an eye, in accordance with aspects of the disclosure.

FIG. 9 illustrates a front view of a near-eye optical element 840 placed in front of an eye 286, in accordance with aspects of the disclosure. FIG. 9 shows that a first outcoupling element 813 of first waveguide 810 may extend to an edge of near-eye optical element 840 and therefore first outcoupling element 813 may extend to a boundary of a frame (e.g. 102) to provide wide-field image light 891 to substantially all of the augmented FOV of the user, when near-eye optical element 840 is inserted into a frame (e.g. 102) of an HMD. Second outcoupling element 823 occupies a smaller footprint than first outcoupling element 813 and does not extend to the boundary of near-eye optical element 840, in FIG. 8. Second outcoupling element 823 may be positioned to provide the inset image light 892 to eye 286 where pupil 289 will be positioned a majority of time for experiences or tasks that benefit from higher resolution images. In some examples, second outcoupling element 823 is roughly centered in near-eye optical element 840. In other embodiments, second outcoupling element 823 is positioned slightly down and slightly nasally with respect to eye 286 to provide the narrow FOV of the inset image light for activities that benefit from higher resolution images such as reading, for example. First outcoupling element 813 is configured to not outcouple wide-field image light 891 through second outcoupling element 823, in some embodiments.

Figure 10:
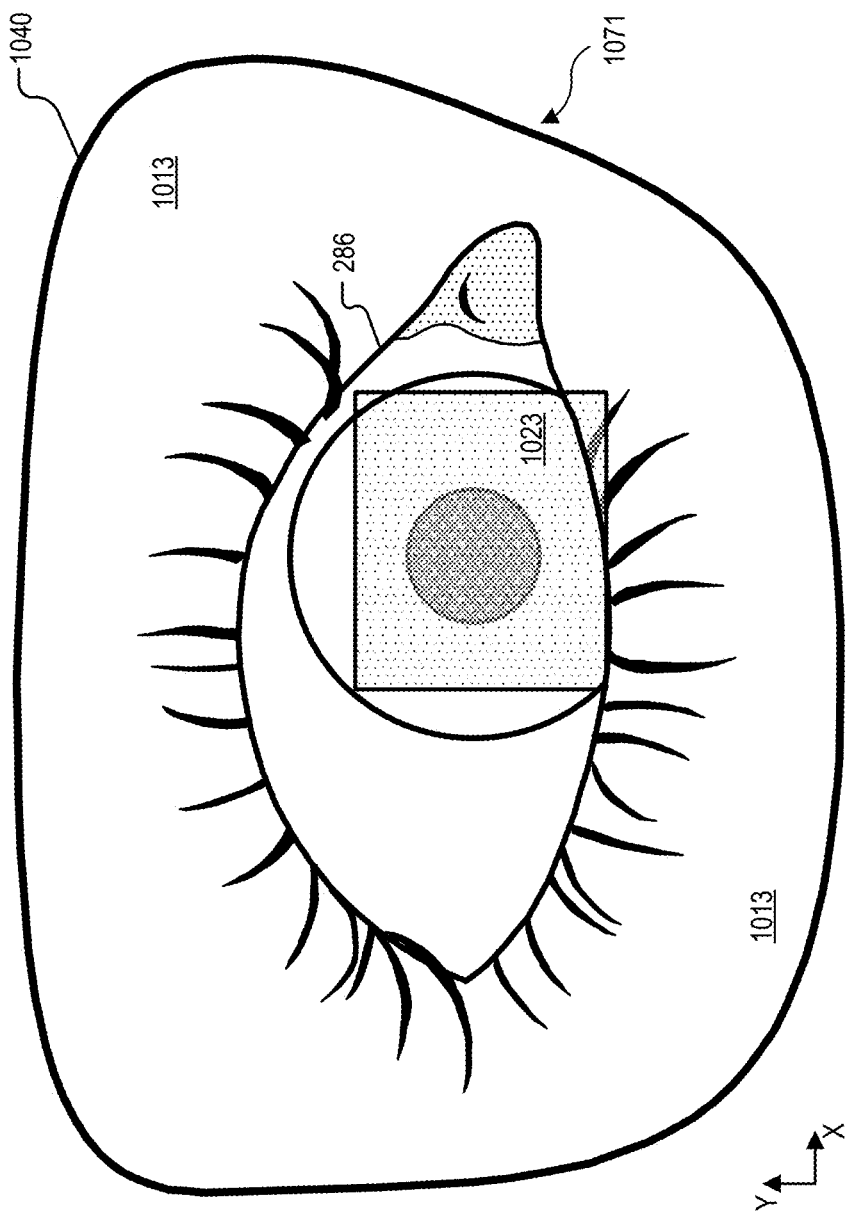
FIG. 10 illustrates a front view of a near-eye optical element placed in front of an eye where a second outcoupling element is offset, in accordance with aspects of the disclosure.

FIG. 10 illustrates a front view of a near-eye optical element 1040 placed in front of an eye 286, in accordance with aspects of the disclosure. In FIG. 10, second outcoupling element 1023 is positioned slightly down and slightly nasally with respect to eye 286 to provide a narrow FOV of the inset image light for activities that benefit from higher resolution images. Outcoupling elements 223, 523, and 823 may be positioned similarly to second outcoupling element 1023.

Figure 11:
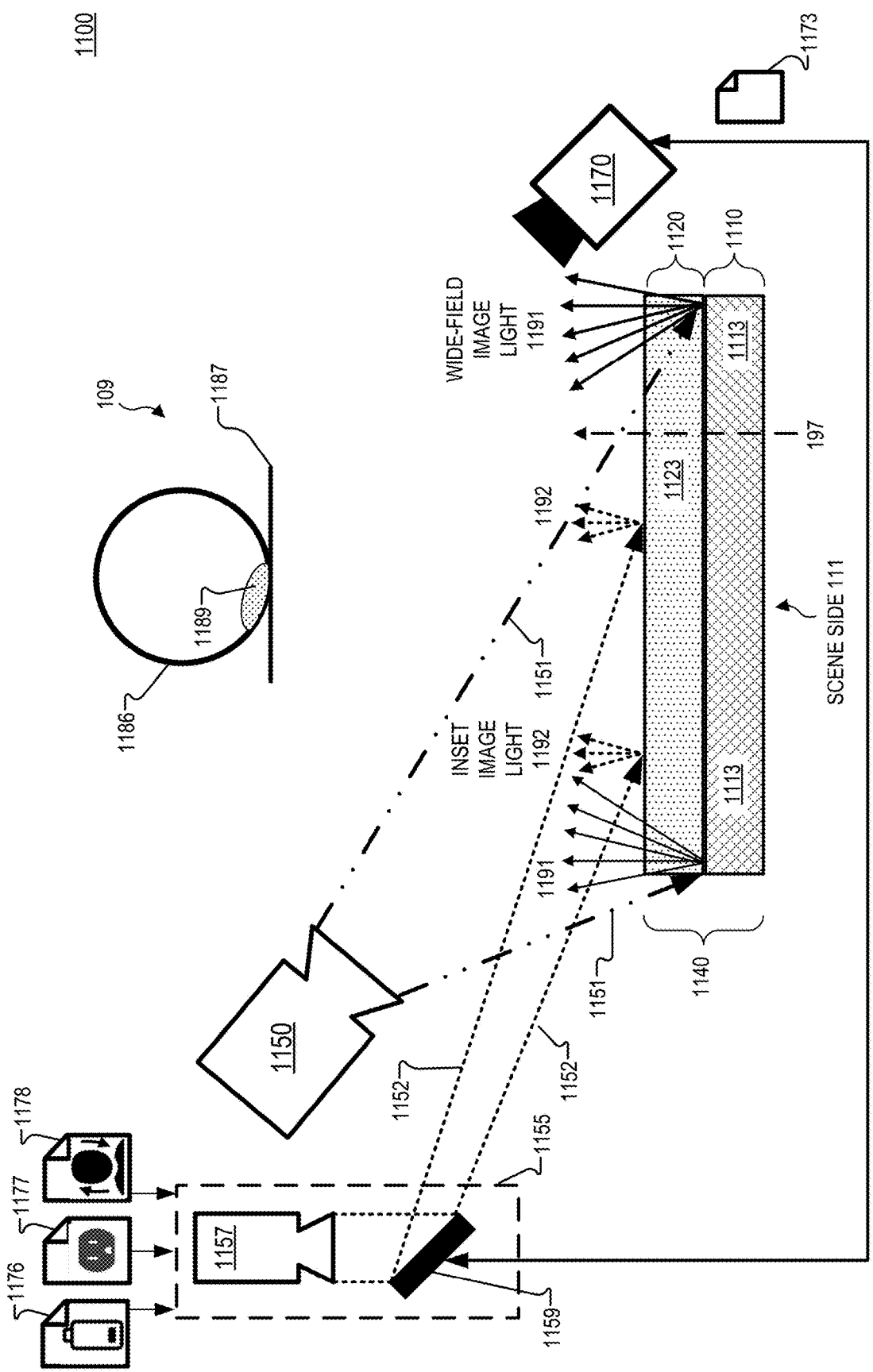
FIG. 11 illustrates a near-eye display system that includes a steerable projector and a near-eye optical element, in accordance with aspects of the disclosure.

FIG. 11 illustrates a near-eye display system 1100 that includes a steerable projector 1155 and a near-eye optical element 1140, in accordance with aspects of the disclosure. Near-eye display system 1100 also includes an image generator 1150 and an eye-tracking camera module 1170. Image generator 1150 is configured to generate first display light 1151 and steerable projector 1155 is configured to generate second display light 1152. Near-eye optical element 1140 includes a first waveguide 1110 configured to generate wide-field image light 1191 from first display light 1151. Near-eye optical element 1140 also includes a second waveguide 1120 configured to generate inset image light 1192 from second display light 1152 received from steerable projector 1155. Second waveguide 1120 may support the higher pixel density inset image light 1192 being presented anywhere within the wide FOV associated with wide-field image light 1191.

In the embodiment of FIG. 11, steerable projector 1155 includes an image projector 1157 and a steerable mirror 1159 to direct the second display light 1152 to different coordinates of second waveguide 1120. Image projector 1157 may include an LCOS projector architecture, in some embodiments. Steerable mirror 1159 may be implemented with galvo scanners, piezo mirrors, or other micro-electromechanical systems (MEMS) technology. By directing second display light 1152 to different coordinates of second waveguide 1120, inset image light 1192 will be outcoupled by different coordinates of the second outcoupling element 1123 so that the inset image light 1192 can be moved around eyebox area 1187. In some embodiments, the steerable projector 1155 selectively steers the second display light 1152 to different coordinates of the second waveguide in response to receiving eye-tracking data 1173 from eye-tracking camera module 1170. In some embodiments, the incoming angles of second display light 1152 are modulated to change outgoing angles of inset image light 1192 in order to present inset image light 1192 to pupil 1189.

Eye-tracking camera module 1170 may include a complementary metal-oxide semiconductor (CMOS) image sensor. An infrared filter that receives a narrow-band infrared wavelength may be placed over the image sensor so it is sensitive to the narrow-band infrared wavelength while rejecting visible light and wavelengths outside the narrow-band. Infrared illuminators (not illustrated) such as infrared LEDs that emit the narrow-band wavelength may be oriented to illuminated eye 1186 with the narrow-band infrared wavelength. Eye-tracking camera module 1170 may be configured to capture infrared images of eye 1186 and perform analysis on the infrared images to determine a position of eye 1186. For example, a position of pupil 1189 may be determined from the infrared images. A position of the eye 1186 may be determined from the position of pupil 1189 in a series of images, and the pupil position may be included in eye-tracking data 1173. Other systems and processing techniques may also be used to generate eye-tracking data 1173.

Steerable mirror 1159 may direct the second display light 1152 to different coordinates of second waveguide 1120 in response to the eye-tracking data 1173. In FIG. 11, eye 1186 is gazing slightly left and steerable mirror 1159 has directed second display light 1152 into second waveguide 1120 such that the inset image light 1192 is outcoupled by outcoupling element 1123 to the pupil position of eye 1186. Hence, steerable projector 1155 may provide inset image light 1192 to where eye 1186 is gazing based on eye-tracking data 1173 so that eye 1186 is provided a higher pixel density of inset image light 1192 where the eye is gazing while still having the wide-field image light 1191 fill a wide FOV of the user. Having the wide-field image light 1191 fill the wide FOV of the user is advantageous so virtual images do not disappear when they are viewed within frame 102, for example. The inset image light 1192 is presented in a narrower field of view than the wide FOV of the wide-field image light 1191, although the higher resolution of the inset image light provides higher resolution image light to the user's eye where the higher resolution image light will be more noticeable.

Although image generator 1150 and steerable projector 1155 are illustrated as projecting the first portion of the display light 1151 and second portion of the display light 1152 directly onto outcoupling elements 1113 and 1123, display light 1151 and 1152 may enter from the ends/sides of waveguides or the front/back of waveguides 1110 and 1120 (at incoupling regions such as 425, for example) and be directed to outcoupling elements 1113 and 1123 by the waveguides 1110 and 1120.

FIG. 11 illustrates that steerable projector 1155 may receive a variety of system inputs from near-eye display system 1100. In particular, steerable projector 1155 may receive battery status data 1176, power status data 1177, and head-motion data 1178. Battery status data 1176 may indicate a remaining battery supply of an HMD and the power status data 1177 may indicate whether the HMD is receiving input power. An HMD may receive input power from a wireless charger or from being plugged into a power source, for example. Head-motion data 1178 may indicate a rapid head motion from a user of the HMD, for example. Head-motion data 1178 may be outputted by an accelerometer included in an HMD, for example.

Figure 12:
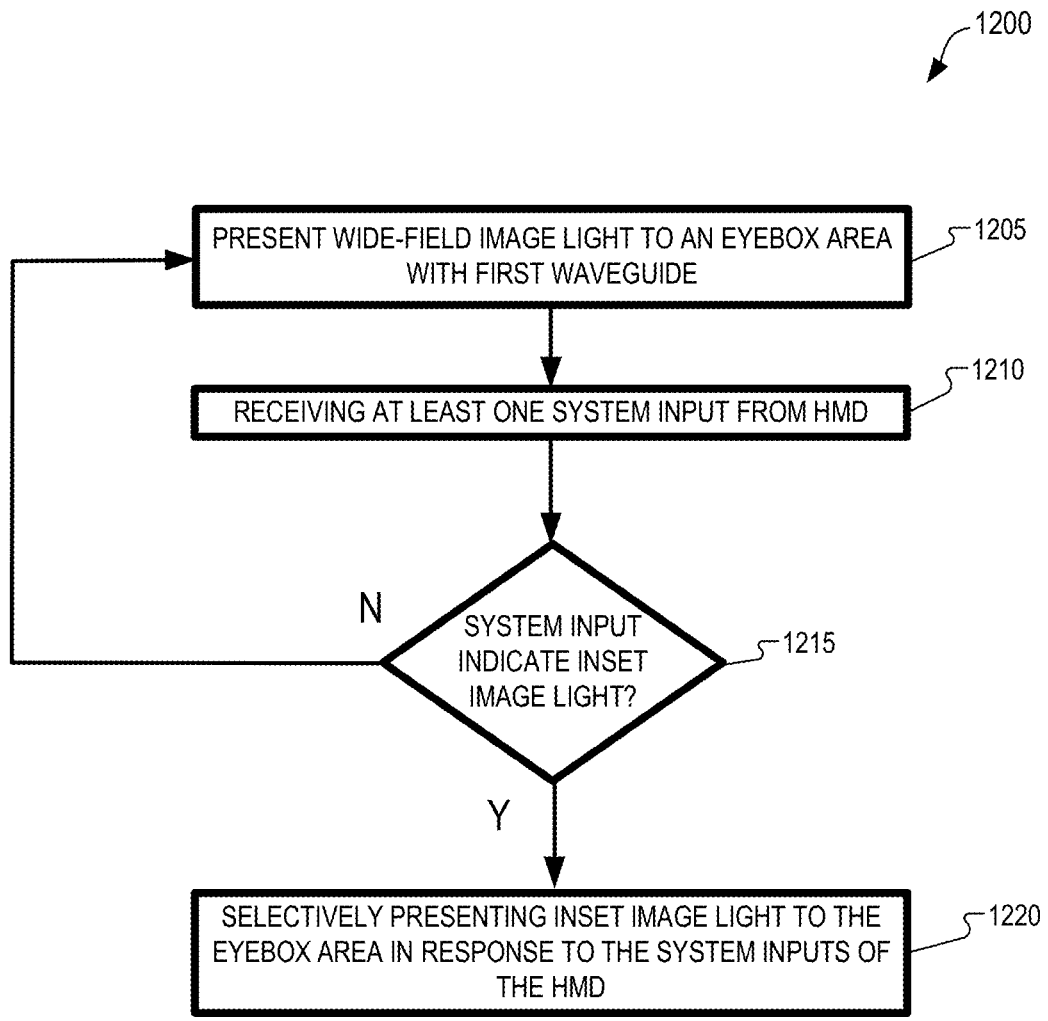
FIG. 12 includes a flow chart of an example process of selectively providing inset image light, in accordance with aspects of the disclosure.

FIG. 12 includes a flow chart of an example process 1200 of selectively providing inset image light, in accordance with aspects of the disclosure. The order in which some or all of the process blocks appear in process 1200 should not be deemed limiting. Rather, one of ordinary skill in the art having the benefit of the present disclosure will understand that some of the process blocks may be executed in a variety of orders not illustrated, or even in parallel.

In process block 1205, a wide-field image light (e.g. 291/591/891/1191) is presented to an eyebox area (e.g. eyebox area 287/1187). The wide-field image light fills an augmented FOV defined by a frame of an HMD. A first waveguide is configured to generate the wide-field image light.

At least one system input is received in process block 1210. One example system input may include head-motion data and the inset image light may be deactivated when the head-motion data indicates a rapid head motion from a user of the HMD. An acceleration value over a particular acceleration threshold may indicate rapid head motion from a user, for example. When a user is involved in a rapid head motion, the inset image light can be turned off (deactivated) because higher resolution inset image light will not likely improve the user experience during a rapid head motion. For example, a user is unlikely to engage in tasks such as reading that require high resolution images during a rapid head movement.

In an embodiment, the one or more system inputs include eye-tracking data (e.g. 1173) of an eye of a user of the HMD and the inset image light is selectively presented in response to an eye-position included in the eye-tracking data. If the eye-tracking data indicates a saccade, the inset image light may be momentarily deactivated since a user is unlikely to engage in a task such as reading that requires high resolution images during a rapid head movement.

In an embodiment, the at least one system input includes battery status data (e.g. data 1176) of an HMD and power status data (e.g. data 1177) of the HMD. The battery status data may indicate a remaining battery supply of the HMD and the power status data may indicate whether the HMD is receiving input power. The inset image light may be deactivated when the remaining battery supply falls below a threshold value and the power status indicates the HMD is not receiving the input power because additional high resolution inset image light would accelerate battery drain.

In process block 1215, it is determined whether the one or more system inputs indicate that inset image light should or should not be presented. If inset image light should not be presented, process 1200 returns to process block 1205. If inset image light should be presented, process 1200 continues to process block 1220.

In process block 1220, inset image light is selectively presented to the eye box are in response to the one or more system inputs of the HMD. In process 1200, the inset image light provides a narrower FOV than the wide-field image light and a second waveguide is configured to generate the inset image light.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A Head Mounted Display (HMD) comprising:
an image generator configured to generate display light;
a first waveguide configured to generate wide-field image light from a first portion of the display light received from the image generator; and
a second waveguide configured to generate inset image light from a second portion of the display light received from the image generator, the inset image light providing a narrower FOV than the wide-field image light, wherein a lower pixel density image included in the wide-field image light includes a pixel void region that is filled by the inset image light.

2. The HMD of claim 1, wherein the first waveguide is stacked with the second waveguide such that the second waveguide is closer to a scene-side of the HMD.

3. The HMD of claim 1, wherein the wide-field image light propagates through at least a portion of the second waveguide but not through a second outcoupling element of the second waveguide.

4. The HMD of claim 1, wherein a first outcoupling element of the first waveguide is disposed on substantially a same plane as a second outcoupling element of the second waveguide, the second outcoupling element inset within the first outcoupling element,
and wherein the image generator includes a projector configured to project a higher pixel density image as the second portion of the display light onto the second outcoupling element to generate the inset image light, the projector further configured to project a lower pixel density image as the first portion of the display light onto the first outcoupling element.

5. The HMD of claim 1, wherein the second waveguide is configured to reflect green light as the inset image light, wherein the second waveguide is not configured to output red light and blue light.

6. The HMD of claim 1, wherein the second portion of the display light is displayed in a lower persistence mode and at a higher frame rate than the first portion of the display light to reduce motion blur associated with the inset image light.

7. The HMD of claim 1, wherein the narrower FOV of the inset image light is offset slightly down and slightly nasally with respect to an eyebox area.

8. The HMD of claim 1, wherein the image generator is configured to interleave the first portion of the display light and the second portion of the display light.

9. The HMD of claim 1 further comprising:
a frame defining an augmented field of view (FOV) of a user of the HMD, wherein the first waveguide includes a first incoupling region to receive the first portion of the display light and a first outcoupling element of the first waveguide is configured to output the wide-field image light, and wherein the second waveguide includes a second incoupling region to receive the second portion of the display light and a second outcoupling element to output the inset image light, the second incoupling region outside of the augmented FOV defined by the frame.

10. The HMD of claim 1, wherein the image generator includes a liquid crystal on silicon (LCOS) projector.

11. The HMD of claim 1, wherein the first waveguide includes a first diffractive structure to generate the wide-field image light, and wherein the second waveguide includes a second diffractive structure to generate the inset image light.

12. The HMD of claim 1, wherein the augmented FOV exceeds 60 degrees horizontal, and wherein the narrower FOV occupied by the inset image light exceeds 30 degrees horizontal.

13. A near-eye display system comprising:
an image generator configured to generate first display light;
a first waveguide configured to generate wide-field image light from the first display light received from the image generator, wherein the wide-field image light is presented in a wide FOV of a user;
a steerable projector configured to generate second display light; and
a second waveguide configured to generate inset image light from the second display light received from the steerable projector, wherein the steerable projector selectively steers the second display light to different coordinates of the second waveguide in response to receiving eye-tracking data, wherein the inset image light is presented to a narrower FOV than the wide FOV and the inset image light has a higher pixel density than the wide-field image light, and wherein the first waveguide is disposed between an entirety of the second waveguide and a scene side of the near-eye display system.

14. The near-eye display system of claim 13, wherein the second waveguide supports the higher pixel density inset image light being presented anywhere within the wide FOV, and wherein the steerable projector is configured to steer the second display light to coordinates of the second waveguide that can deliver the inset image light to a pupil of the user.

15. The near-eye display system of claim 13, wherein a first outcoupling element of the first waveguide and a second outcoupling element of the second waveguide are diffractive outcoupling elements.

16. A method of providing image light with a head mounted display (HMD), the method comprising:
presenting wide-field image light to an eyebox area, wherein the wide-field image light fills an augmented field of view (FOV) defined by a frame of the HMD, and wherein a first waveguide is configured to generate the wide-field image light;
receiving one or more system inputs from the HMD; and
selectively presenting inset image light to the eyebox area in response to the one or more system inputs of the HMD, the inset image light providing a narrower FOV than the wide-field image light wherein a second waveguide is configured to generate the inset image light, and wherein the one or more system inputs includes head-motion data, wherein the inset image light is de-activated when the head-motion data indicates a rapid head motion from a user of the HMD.

17. The method of claim 16, wherein the one or more system inputs includes a battery status of the HMD and a power status of the HMD, wherein the battery status indicates a remaining battery supply and the power status indicates whether the HMD is receiving input power, the inset image light being deactivated when the remaining battery supply falls below a threshold value and the power status indicates the HMD is not receiving the input power.

18. The method of claim 16, wherein the one or more system inputs includes eye-tracking data of an eye of a user of the HMD, wherein the inset image light is selectively presented in response to an eye-position included in the eye-tracking data.

* * * * *